C. RHODES.
COTTON PICKER.
APPLICATION FILED NOV. 3, 1913.
1,166,935.
Patented Jan. 4, 1916.
2 SHEETS—SHEET 1.
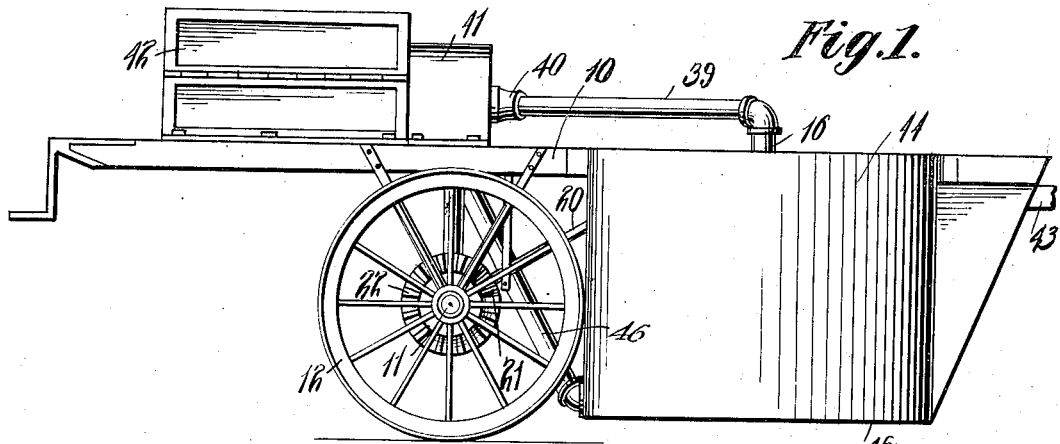
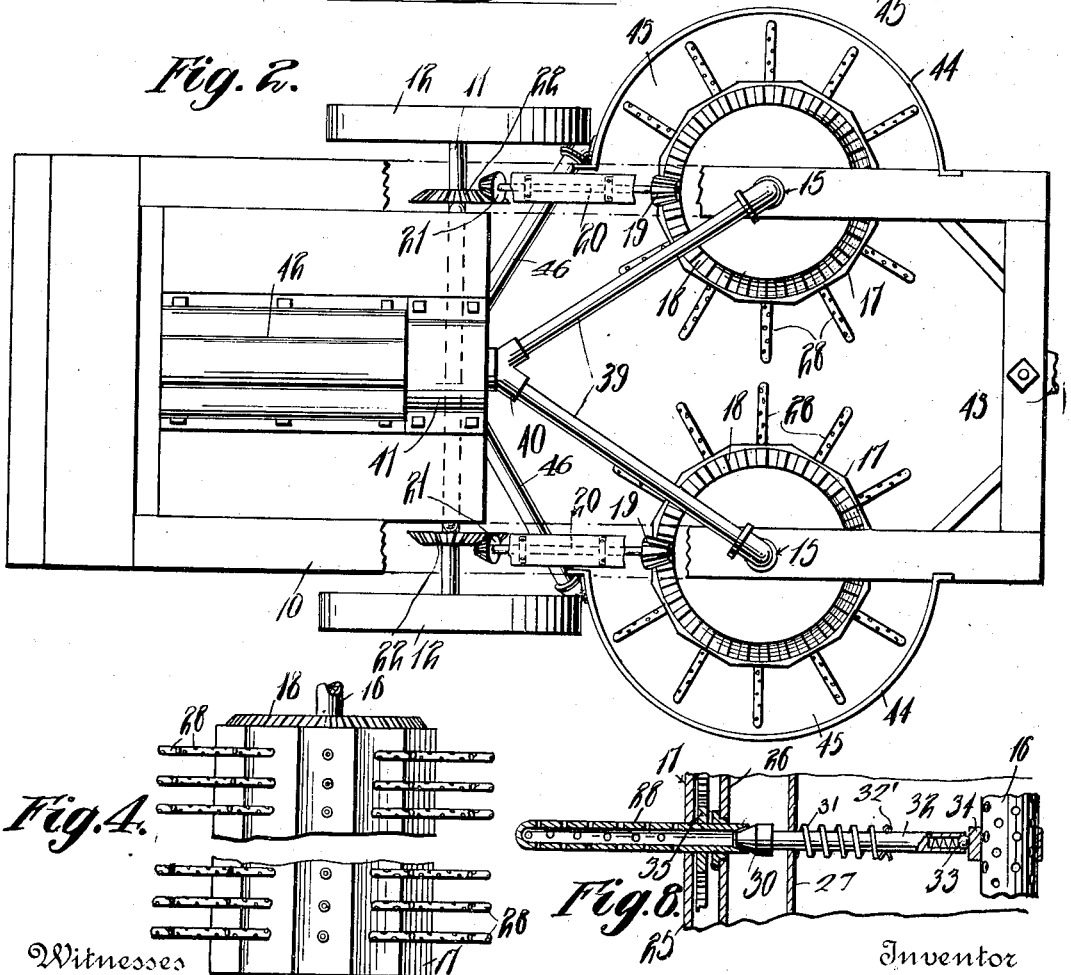
Witnesses
W. C. Fielding
Harry M. Test
Inventor
C. Rhodes,
By
Attorneys

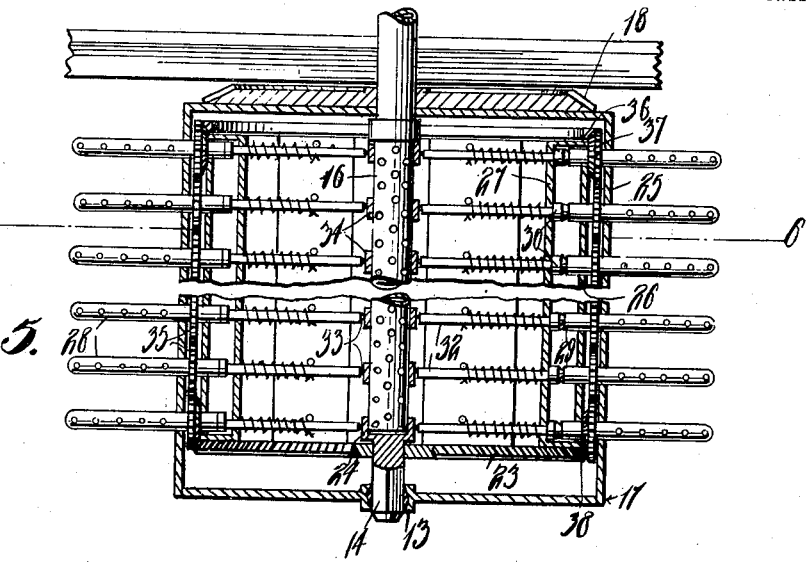
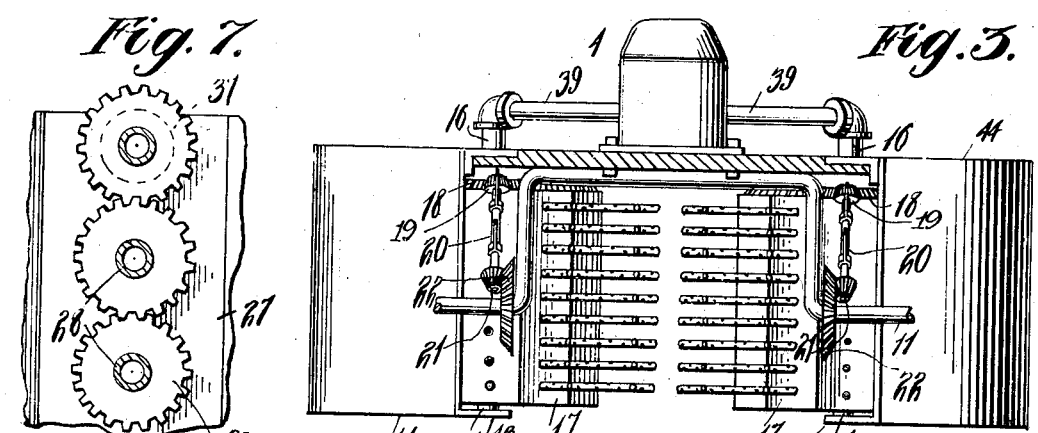
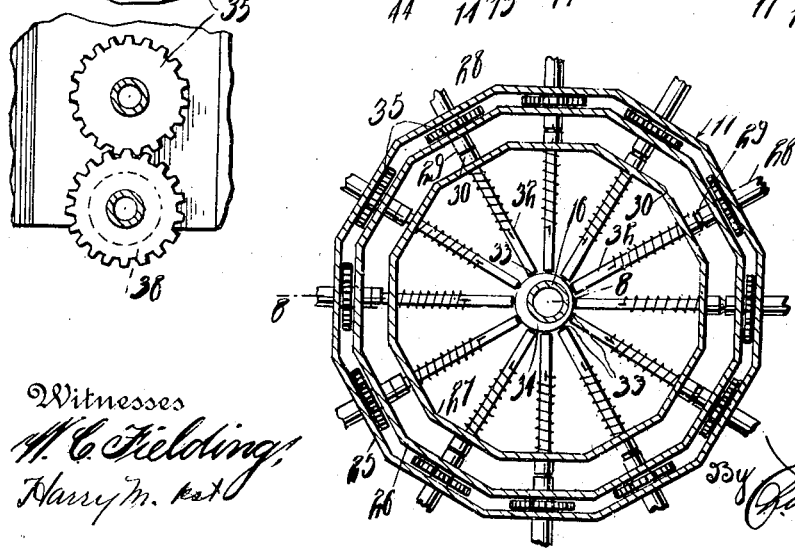

UNITED STATES PATENT OFFICE.

CLYDE RHODES, OF COOLEDGE, TEXAS.

COTTON-PICKER.

1,166,935.  Specification of Letters Patent.  Patented Jan. 4, 1916.

Application filed November 3, 1913. Serial No. 799,015.

*To all whom it may concern:*

Be it known that I, CLYDE RHODES, a citizen of the United States, residing at Cooledge, in the county of Limestone, State of Texas, have invented certain new and useful Improvements in Cotton-Pickers; and I do hereby declare the following to be a full, clear, and exact description of the invention, such as will enable others skilled in the art to which it appertains to make and use the same.

This invention relates to improvements in cotton pickers, and particularly to pneumatic cotton pickers.

The principal object of the invention is to provide rotatable suction devices which will draw the cotton from the plants in one part of the rotation and drop the same in the remaining part of the rotation.

Another object resides in the provision of novel means for driving the pickers and discharging the picked cotton into suitable receptacles.

A still further object resides in novel means for permitting suction in the portion of each of the pickers when engaging the plant, while at the same time relieving suction in the opposite side of each of the pickers to permit the cotton to drop therefrom.

Other objects and advantages will be apparent from the following description, when taken in connection with the accompanying drawings.

In the drawings: Figure 1 is a side elevation of my cotton picker machine. Fig. 2 is a top plan view. Fig. 3 is a rear elevation. Fig. 4 is an elevation of one of the rotatable drums. Fig. 5 is an enlarged vertical sectional view therethrough. Fig. 6 is a horizontal sectional view on the line 6—6 of Fig. 5. Fig. 7 is a fragmentary interior elevation of a portion of the drum showing the gearing of the picker stems. Fig. 8 is an enlarged vertical section on the line 8—8 of Fig. 6, showing only one of the picker stems and valve therefor.

Referring particularly to the accompanying drawings, 10 represents a suitable framework carrying an axle 11 on which are mounted the ground engaging wheels 12 for supporting the frame the proper distance above the ground so that the picker devices will be in proper position for collecting the cotton from the plants, this axle being arched for a reason well known.

Secured to the side rails of the frame, and depending therebelow are suitable brackets 13, and stepped in the lower ends of these brackets are the stub shafts 14. Disposed through openings 15 in each of the side rails of the frame are depending pipes 16, the lower portions of which are perforated as shown, and each disposed within a drum 17. This drum has secured to its upper end, and rotatable on the upper portion of the pipe 16, below the side rail, a beveled pinion 18 with which is meshed a beveled pinion 19 carried by suitably mounted downwardly and rearwardly inclined shafts 20, said shaft carrying a beveled pinion 21 on its lower end driven from a beveled pinion 22 carried by the axle 11. The beforementioned stub shaft 14 is rigidly secured against rotation in the bracket 13, and keyed on the said stub shaft within the drum 17 is a large beveled pinion 23. The upper end of the stub shaft is formed with a cup-shaped recess 24 in which is secured the lower end of the perforated portion of the pipe 16. Thus the pipe 16 is also held against rotation. The drum 17 comprises the concentrically arranged and spaced walls 25, 26 and 27, and extending radially through openings in the walls 25 and 26 are the vertical series of hollow perforated picker stems 28. The outer ends of the stems are closed, while the inner ends are open and beveled to form seats 29 for the reception of correspondingly beveled valve heads 30. Each of these valve heads carries a stem 32 which extends inwardly through the wall 27, a spring 31 being provided to encircle the stem and normally hold the valve head off its seat, said spring having its inner and outer ends disposed respectively between said wall and a pin 32' passed transversely through the stem. The inner terminal of the stem 32 is provided with a spring-pressed roller bearing engaging with a cam ring 34 carried by the perforated portion of the pipe 16. As shown, there are a plurality of superimposed circular series of these picker stems and valve stems, and all of the cam rings 34 are arranged in a vertical line on one side of the pipe 18 so that one or more vertical lines of valve stems 32 will engage the rings simultaneously for a purpose which will appear in the description of the operation of the device. Rigidly secured on each of the picker stems, and between the walls 25 and 26 is a pinion 35, the pinions of all of the stems of each vertical line intermeshing so that the adjacent stems are adapted to rotate continuously in opposite directions.

Mounted at the upper end of the perforated portion of the pipe 16, and within the drum is a beveled pinion 36 which meshes with the smaller beveled pinion 37 disposed inwardly of, and formed integrally with the pinions 35 of the uppermost picker stems. The lowermost pinions 25 are provided with beveled pinions 38 similarly disposed and formed with the pinions 37, these pinions 38 meshing with the beforementioned pinion 23. Thus, as the drum 17 rotates, the lowermost pinions 35 are driven by the pinion 33 and transmit alternate opposite rotation to the picker stems 28 thereabove, the uppermost beveled pinion 37 engaging the pinion 36 to relieve the strain on the intermediate pinions 35.

Connected to the upper end of each of the pipes 16 is a horizontally disposed and inwardly directed pipe 39, the inner ends of the said pipes meeting in a coupling 40 carried by a suction fan 41 which is suitably mounted on the frame 10 and driven by a suitable motor, as the gas engine 42. The frame is provided with a draft pole 43, so that the machine can be drawn by horses.

On the outer side of each of the side rails of the frame and inclosing the outer portions of the drums 17 is a casing 44, this casing having a bottom wall 45 spaced a suitable distance below the lowermost picker stem 28 into which the cotton drops from the picker stems. Connected to the rear side of the casing and extending upwardly to the fan 41 is a cotton conveying pipe 46, this pipe discharging at the rear of the frame into sacks adapted to be held thereunder, but not shown.

In the operation of the device, the machine is drawn by horses, or other power, the machine straddling the row of cotton plants, so that the plants pass between the drums. By means of the gearing driven by the axle, the drums will be rotated on the stub shafts 14, while at the same time the pinion 23 will cause the independent rotation of the picker stems 28. The engine 42 is, at the same time driving the fan 41 to create suction in the pipe 16, and as the picker stems pass througn the plants, the valve heads 30 are withdrawn so that suction is created in the stems to cause the cotton to adhere thereto. As the drum rotates, and the stems which carry the cotton pass around to the opposite side, within the casing 44, the inner ends of the valve stems 32 engage with the cam rings and force the valve heads into their seats. This prevents or relieves suction in the picker stems at the side of the drum within the casings 44 and permits the cotton to drop from the stem to the bottom of the said casing.

The suction in the pipes 46 draws the cotton from the bottom of the casing and discharges it at the rear of the frame of the machine where bags or baskets are to be held to receive it.

What is claimed is:—

1. A cotton harvester comprising a wheeled frame, hollow perforated rotating drums, rotating picker stems on the drums and open to the interiors thereof, means for creating suction in the drum, and means for closing the stems successively during a part of the rotation of the drums.

2. A cotton harvester, rotating drums, radially extending hollow and perforated picker stems mounted on the drums and open to the interiors thereof, means for creating a constant suction in the drums, means for rotating the stems independently of the drums, and means for closing the stems against the suction as said stems pass a predetermined point.

3. A cotton harvester, rotating drums, radially extending hollow and perforated picker stems mounted on the drums and open to the interiors thereof, means for creating a constant suction in the drums, means for rotating the stems independently of the drums, valves seated in the inner ends of the stems, means holding the valves normally seated, and means for forcing the valves to be seated during a part of the rotation of the drums.

4. In a cotton harvester, a rotating drum, hollow perforated picker stems mounted on the drum, means for rotating the stems independently of the drum, the inner ends of the stems being open and formed with valve seats, valves for the seats, resilient means for holding the valves normally away from the seats, and means for seating the valves during a part of the rotation of the drum.

5. In a cotton harvester, a rotating drum, a suction means, a pipe connected to the suction means and extending into the drum, the portion of the pipe within the drum being perforated, a plurality of hollow perforated stems extending radially from the drum and open to the interiors thereof, means for rotating the drum and stems independently, valves for closing the inner ends of the stems, means for holding the valves normally open, and means carried by the perforated portion of said pipe for seating the valves during a portion of the rotation of the drum.

In testimony whereof, I affix my signature, in the presence of two witnesses.

CLYDE RHODES.

Witnesses:
W. M. PRICHARD,
RUFUS S. BURLESON.